Jan. 6, 1959   S. A. GETTS   2,867,140
CORE DRILL
Filed Dec. 15, 1955   2 Sheets-Sheet 1
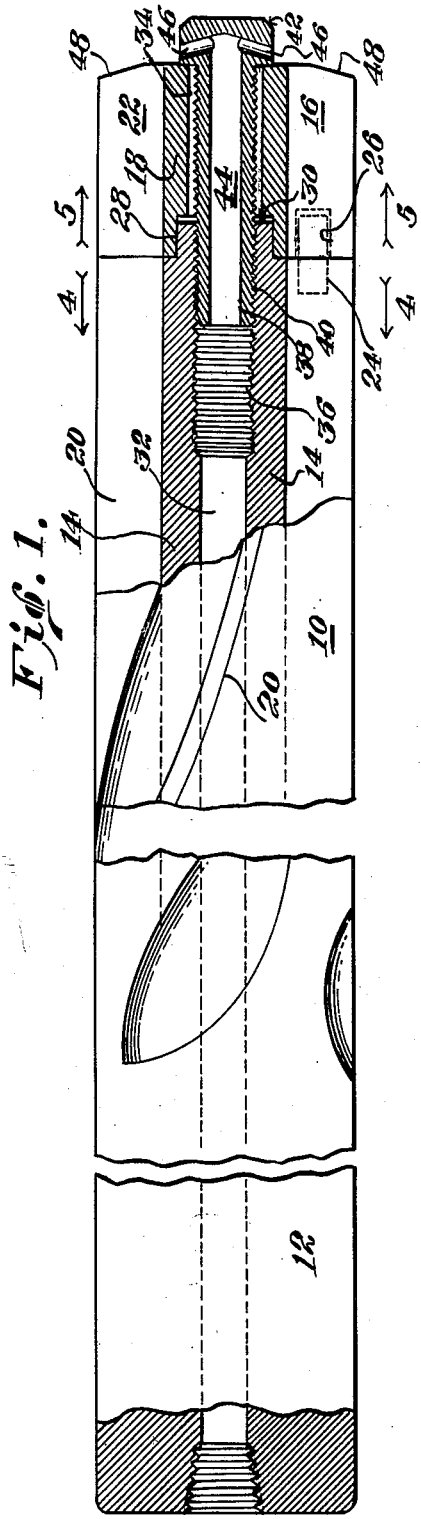
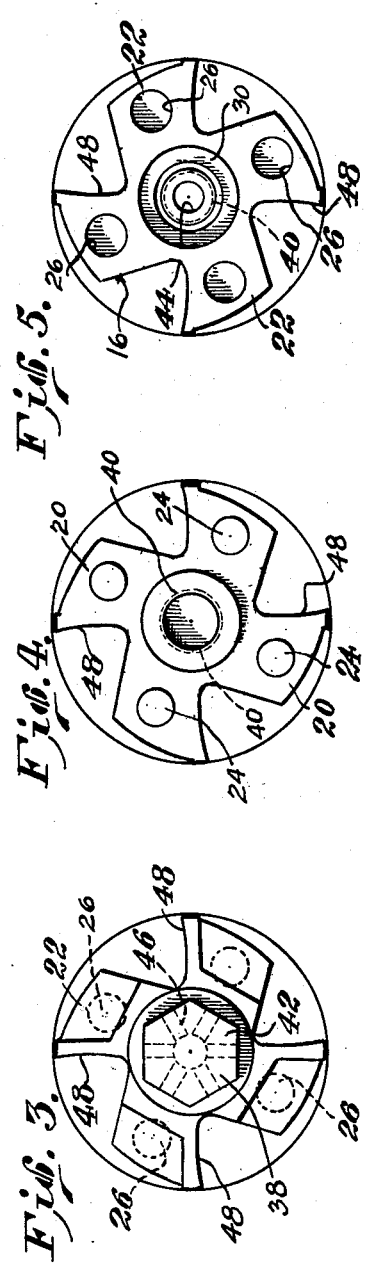
INVENTOR.
Sidney A. Getts.
BY
Mason & Mason
Attorneys.

Jan. 6, 1959       S. A. GETTS       2,867,140
CORE DRILL
Filed Dec. 15, 1955       2 Sheets-Sheet 2
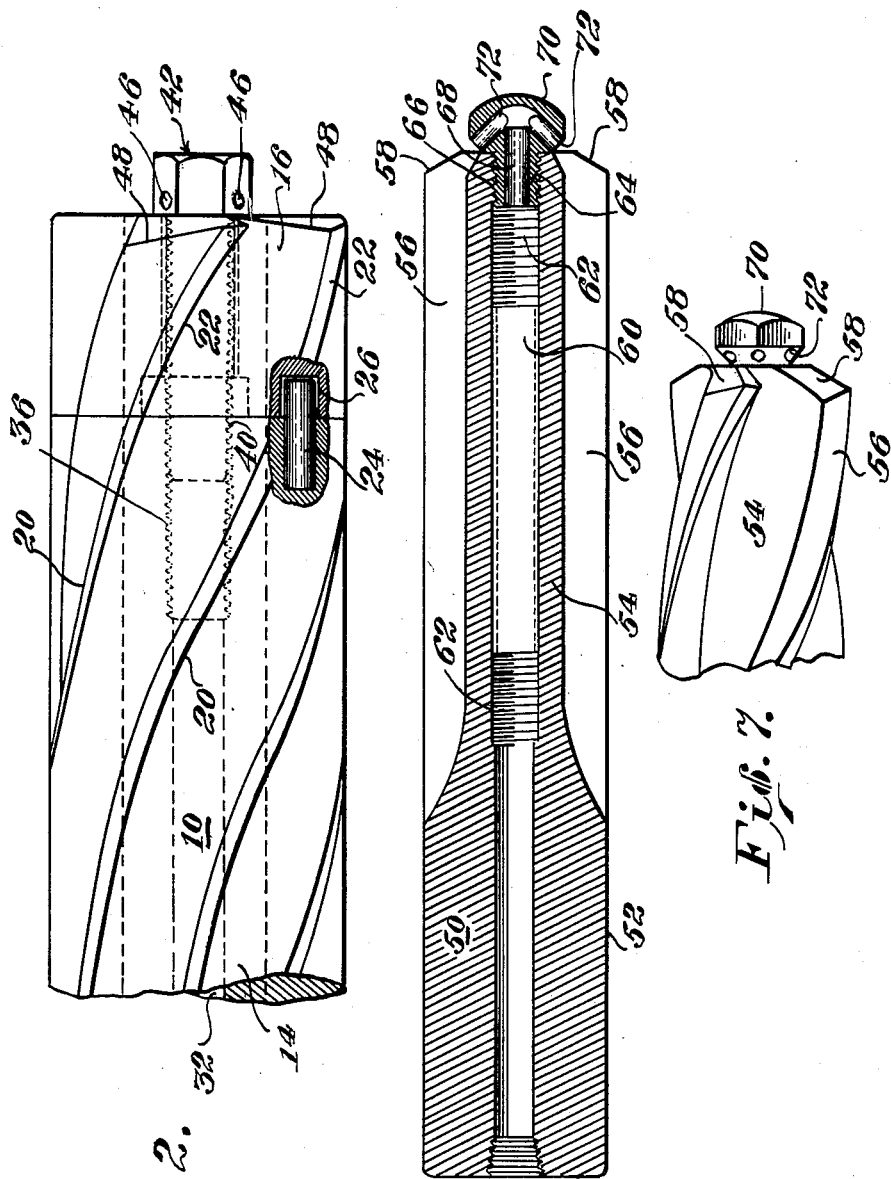
INVENTOR.
Sidney A. Getts.
BY
Mason & Mason
Attorneys.

United States Patent Office 2,867,140
Patented Jan. 6, 1959

2,867,140

CORE DRILL

Sidney A. Getts, Rockford, Ill., assignor to Metal Cutting Tools, Inc., Rockford, Ill., a corporation of Illinois Application December 15, 1955, Serial No. 553,326

1 Claim. (Cl. 77—58)

This invention relates to a core drill of the type hereinafter described and claimed.

An object of the invention is to provide a core drill having fluid passageway means for conveying fluid directly to the cutting edges of the tool.

Another object is the provision of a replaceable cutting tip member with means for conveying fluid through the bit member shank and tip member onto the cutting edges thereof.

An additional object is the provision of flutes on the shank member and tip member of a core drill with means retaining the tip member on the shank that provides fluid passageway means leading directly to the cutting edges of the tip.

A further object is to provide a drill of the type described in the next above paragraph and wherein it is possible to pump fluid through the tool to the cutting edges thereof without requiring the drilling of holes in the flutes prior to the twisting of the flutes. This construction permits use of the standard tip for an oil-hole type drill as well as a core drill without oil holes.

Yet another object is to provide a core drill with a replaceable tip member which is so constructed that portions of the flutes of the core drill member shank and the flutes of the tip member are interlocked to provide a waist portion on the shank and tip of minimum size whereby to allow for an oil or other fluid passageway in the shank member and the tip member thereof.

Another object is to provide a driving connection between the flutes of the shank member and those on the tip member so as to directly transmit torque from the shank flutes to the tip flutes. This construction will remove most of the driving torque which is ordinarily taken by the waist portion of the shank member thereby permitting the use of shank members having thinner waist portions.

Other objects will appear hereinafter throughout the specification.

In the drawings:

Figure 1 is a side elevation partly in section showing one form of the invention;

Figure 2 is a view similar to Figure 1, with parts broken away;

Figure 3 is an end view of the structure of Figs. 1 and 2;

Figure 4 is an end view of the shank member taken on the line of arrows 4—4 of Figure 1;

Figure 5 is an end view of the tip member taken on the line 5—5 of Figure 1;

Figure 6 is a side elevation partly in section of a second form of the invention; and Figure 7 is a side elevation partly broken away of the structure shown in Fig. 6.

As shown in Figures 1 to 5 the numeral 10 indicates the drill as a whole, and it comprises a shank member 12 having a waist portion 14, and a tip member 16 having a waist portion 18.

The shank member has a plurality of flutes 20 and the tip member is provided with corresponding flutes 22. Means are provided to directly drive the tip member flutes by the shank member flutes. This means may take the form of a pin and hole or socket drive connection as shown in the drawings, although other drive means may be substituted such as a key and slot connection, not shown. The pins 24 may be located on the flutes 20, and the sockets 26 on the flutes 22 as shown, or vice versa. This construction provides a structure wherein the flutes 20 and 22 are automatically retained in alignment with each other, and where the driving torque of flutes 20 is directly applied to flutes 22. This construction moreover allows for the provision of the boss 28 on the shank 12 that interfits with the shank recess 30, together with the passageways 32 and 34 respectively in the shank and tip. Should the locking means be located radially inwardly of the flutes, such could only be accomplished by a substantial thickening of the waist portions 14 and 18 of these parts, assuming it be desired to retain the boss 28 and its socket 30, as well as the fluid passageways above noted.

The boss 28 and recess 30 are completely interfitting, and may be cylindrical in cross-section, or they may be multisided in cross-section such as square, octagonal, hexagonal, etc., in configuration.

The passageway 32 is preferably provided with internal screw threads 36 whilst the tip passageway 34 is unthreaded to provide a smooth bore.

The tip member is prevented from moving longitudinally of the shank member 14 by the bolt 38 which has threads 40 that engage threads 36 of the shank member. This bolt is provided with a head 42, a longitudinal fluid passageway 44 and bolt head passageways 46. These latter extend substantially radially outwardly and are inclined rearwardly of the tip member so as to apply the fluid, such as oil, issuing therefrom, directly onto the cutting edges 48 of the tip member flutes. These cutting edges preferably slant radially rearwardly in the same direction as the passageways 46. The flutes preferably are of spiral shape as shown and the pins 24 have a driving fit with sockets 26.

Figures 6 and 7 show another form of the invention, these figures showing a solid core type of drill. In these figures, 50 indicates the drill as a whole. The drill has a shank member 52, a waist portion 54, and spiral flutes 56, terminating in cutting edges 58.

Extending longitudinally of the shank member is a central passageway 60 having internal screw threads 62 adjacent one end thereof. These threads are engaged by the external threads 64 of the bolt 66.

The bolt has a central passageway 68, a head 70 and radially slightly rearwardly inclined passageways 72 that extend in the same direction as the cutting edges 58.

The structure of Figures 6 and 7 may be used when a solid core drill construction is desired. However, the preferred construction is shown in Figures 1 to 5 wherein the flutes of the tip member and shank member are drivingly connected to each other by the interlocking pins and sockets on the flutes to thereby provide room for the shoulder 28 and socket 30, and also space for the passageways 32 and 44.

It will be obvious to those skilled in the art that various changes may be made in the two forms of the invention without departing from the spirit and scope thereof, and, therefore, the invention is not limited by that which is shown in the drawings and described in the specification but only as indicated in the appended claim.

What is claimed is:

In a drill, the combination of a rotary shank member, said shank member having a plurality of flutes, a removable tip member, said tip member being provided with a plurality of flutes each having a cutting edge at its outer end, said cutting edges being inclined outwardly and rearwardly and the flutes of said tip member being symmetrically arranged with respect to the flutes of said shank member, means comprising a pin and socket connection for connecting each shank flute to one of said tip flutes to transmit driving torque from said shank flutes to said tip flutes, one of said members having a central boss and the other member having a corresponding recess, said boss being seated in said recess to axially align said members, said tip member having an axial passageway, means for rigidly holding said tip member and said shank together and for preventing relative longitudinal movement comprising a bolt, said shank and said bolt each having an axial passageway, said shank and bolt passageways being in fluid communication so as to convey fluid to said cutting edges, said last named means including mutually engageable means on said bolt and said shank, said bolt having a head in engagement with the outer end of said tip member, a plurality of radial passages in said head each communicating with said bolt passageway at one end and having their other ends located adjacent to said cutting edges, said radial passages extending slightly rearwardly in substantially the same direction as said cutting edges whereby to discharge fluid from said shank and bolt passageways directly onto said cutting edges.

References Cited in the file of this patent

UNITED STATES PATENTS

| | | |
|---|---|---|
| 1,724,005 | Christensen | Aug. 13, 1929 |
| 2,259,611 | Burger | Oct. 21, 1941 |
| 2,282,596 | Wise et al. | May 12, 1942 |
| 2,555,302 | Cogsdill | June 5, 1951 |
| 2,607,562 | Phipps | Aug. 19, 1952 |

OTHER REFERENCES

"Machinery" Magazine, page 39, July 1947.